US008811615B2

(12) United States Patent
Yu et al.

(10) Patent No.: US 8,811,615 B2
(45) Date of Patent: Aug. 19, 2014

(54) INDEX-BASED CODING WITH A PSEUDO-RANDOM SOURCE

(75) Inventors: Meng-Day Yu, Fremont, CA (US); Srinivas Devadas, Lexington, MA (US)

(73) Assignee: Verayo, Inc., San Jose, CA (US)

( * ) Notice: Subject to any disclaimer, the term of this patent is extended or adjusted under 35 U.S.C. 154(b) by 809 days.

(21) Appl. No.: 12/850,693

(22) Filed: Aug. 5, 2010

(65) Prior Publication Data

US 2011/0033041 A1    Feb. 10, 2011

Related U.S. Application Data

(60) Provisional application No. 61/295,374, filed on Jan. 15, 2010, provisional application No. 61/231,424, filed on Aug. 5, 2009.

(51) Int. Cl.
*H04L 9/00* (2006.01)

(52) U.S. Cl.
USPC ............... 380/268; 380/42; 380/44; 380/46; 380/47; 713/193

(58) Field of Classification Search
USPC ............. 713/193; 380/28–29, 42, 44, 46, 47, 380/268
See application file for complete search history.

(56) References Cited

U.S. PATENT DOCUMENTS

| 4,944,009 | A | * | 7/1990 | Micali et al. ................. 380/46 |
| 4,985,614 | A | | 1/1991 | Pease |
| 5,177,352 | A | | 1/1993 | Carson |
| 5,180,901 | A | | 1/1993 | Hiramatsu |
| 5,204,902 | A | | 4/1993 | Reeds |
| 5,247,577 | A | | 9/1993 | Bailey |
| 5,276,738 | A | * | 1/1994 | Hirsch ......................... 380/46 |
| 5,297,207 | A | * | 3/1994 | Degele ......................... 380/46 |
| 5,307,412 | A | * | 4/1994 | Vobach ......................... 380/42 |

(Continued)

FOREIGN PATENT DOCUMENTS

| CA | 2344429 | 3/2000 |
| DE | 19843424 | 3/2000 |
| EP | 1100058 | 5/2001 |
| EP | 1341214 | 9/2003 |

OTHER PUBLICATIONS

Arazi, B. "Interleaving Security and Efficiency Consiederations in the Design of Inexpensive IC Cards". IEEE Proceedings on Computers and Digital Techniques. vol. 141, Issue 5. Publ. Date. Sep. 1994. pp. 265-270.

(Continued)

*Primary Examiner* — Jeffrey Pwu
*Assistant Examiner* — Jayesh Jhaveri
(74) *Attorney, Agent, or Firm* — Occhiuti & Rohlicek LLP

(57) ABSTRACT

Outputs from at least one pseudo-random source are used to encode hidden value. The hidden value is encoded using index based quantities, for example, based on numerically ordering a sequence of outputs from pseudo-random source(s). In some examples, the numerical ordering of re-generated device-specific quantities is used to re-generate the hidden value, without necessarily requiring additional error correction mechanisms. Information leak may be reduced by constructing system whose "syndrome" helper bits are random, as measured, for example, by NIST's Statistical Tests for Randomness In some examples, index based coding provides coding gain that exponentially reduces total error correction code complexity, resulting in efficiently realizable PRS-based key generation systems. In some examples, index based coding allows noisy PRS to be robust across conditions where conventional error correction code cannot error correct.

19 Claims, 3 Drawing Sheets

(56) References Cited

U.S. PATENT DOCUMENTS

| | | | |
|---|---|---|---|
| 5,375,169 A | | 12/1994 | Seheidt |
| 5,388,157 A | | 2/1995 | Austin |
| 5,420,928 A | * | 5/1995 | Aiello et al. ............ 380/46 |
| 5,438,622 A | * | 8/1995 | Normile et al. .......... 380/46 |
| 5,528,231 A | | 6/1996 | Patarin |
| 5,768,382 A | | 6/1998 | Schneier |
| 5,818,738 A | | 10/1998 | Effing |
| 5,862,094 A | | 1/1999 | Kawabata |
| 5,883,956 A | | 3/1999 | Le |
| 5,920,628 A | | 7/1999 | Indeck |
| 5,963,104 A | | 10/1999 | Buer |
| 6,026,293 A | | 2/2000 | Osborn |
| 6,161,213 A | | 12/2000 | Lofstrom |
| 6,233,339 B1 | | 5/2001 | Kawano |
| 6,246,254 B1 | | 6/2001 | Choukalos |
| 6,289,292 B1 | | 9/2001 | Charlton |
| 6,289,453 B1 | | 9/2001 | Walker |
| 6,289,455 B1 | | 9/2001 | Kocher |
| 6,301,695 B1 | | 10/2001 | Burnham |
| 6,305,005 B1 | | 10/2001 | Burnham |
| 6,324,676 B1 | | 11/2001 | Burnham |
| 6,363,485 B1 | | 3/2002 | Adams |
| 6,386,456 B1 | | 5/2002 | Chen |
| 6,402,028 B1 | | 6/2002 | Graham, Jr. |
| 6,529,793 B1 | | 3/2003 | Beffa |
| 6,535,016 B2 | | 3/2003 | Choukalos |
| 6,848,049 B1 | | 1/2005 | Tailliet |
| 6,973,187 B2 | * | 12/2005 | Gligor et al. ............ 380/28 |
| 7,472,105 B2 | * | 12/2008 | Staddon et al. ............ 1/1 |
| 7,568,113 B2 | | 7/2009 | Linnartz |
| 7,577,850 B2 | | 8/2009 | Barr |
| 2001/0032318 A1 | | 10/2001 | Yip |
| 2001/0033012 A1 | | 10/2001 | Kommerling |
| 2002/0065574 A1 | | 5/2002 | Nakada |
| 2002/0095594 A1 | | 7/2002 | Dellmo |
| 2002/0106087 A1 | | 8/2002 | Lotspiech |
| 2002/0107798 A1 | | 8/2002 | Hameau |
| 2002/0128983 A1 | | 9/2002 | Wrona |
| 2002/0150252 A1 | | 10/2002 | Wong |
| 2002/0188857 A1 | | 12/2002 | Orlando |
| 2002/0199110 A1 | | 12/2002 | Kean |
| 2003/0204731 A1 | | 10/2003 | Pochuev |
| 2003/0204743 A1 | | 10/2003 | Devadas |
| 2003/0219121 A1 | | 11/2003 | Van Someren |
| 2004/0032950 A1 | * | 2/2004 | Graunke ............ 380/42 |
| 2004/0136529 A1 | | 7/2004 | Rhelimi et al. |
| 2004/0148509 A1 | | 7/2004 | Wu |
| 2004/0268117 A1 | * | 12/2004 | Olivier et al. ............ 713/150 |
| 2005/0051351 A1 | | 3/2005 | De Jongh |
| 2006/0227974 A1 | * | 10/2006 | Haraszti ............ 380/280 |
| 2007/0036353 A1 | * | 2/2007 | Reznik et al. ............ 380/30 |
| 2007/0038871 A1 | | 2/2007 | Kahlman |
| 2007/0039046 A1 | | 2/2007 | Van Dijk |
| 2007/0044139 A1 | | 2/2007 | Tuyls |
| 2008/0044027 A1 | | 2/2008 | Van Dijk |
| 2008/0059809 A1 | | 3/2008 | Van Dijk |
| 2008/0106605 A1 | | 5/2008 | Schrijen |
| 2008/0222415 A1 | * | 9/2008 | Munger et al. ............ 713/168 |
| 2009/0161872 A1 | * | 6/2009 | O'Brien et al. ............ 380/271 |
| 2009/0292921 A1 | | 11/2009 | Braun et al. |
| 2010/0073147 A1 | | 3/2010 | Guajardo Merchan et al. |
| 2010/0185865 A1 | * | 7/2010 | Yeap et al. ............ 713/176 |
| 2010/0211787 A1 | * | 8/2010 | Bukshpun et al. ............ 713/170 |
| 2010/0306221 A1 | * | 12/2010 | Lokam et al. ............ 707/759 |
| 2011/0033041 A1 | * | 2/2011 | Yu et al. ............ 380/28 |
| 2011/0055585 A1 | * | 3/2011 | Lee ............ 713/183 |

OTHER PUBLICATIONS

Hon-Sum Wong et al. "Three Dimensional "Atomistic" Simulation of Discrete Random Dopant Distribution Effect in Sub-0.1 μm MOSFET's". IEDM, 29(2):705-708, 1993.

Bennett Yee, "Using Secure Coprocessors," Carnegie Mellon Univeristy, Pittsburgh, PA. May 1994.
Ross Anderson et al. "Low Cost Attacks on Tamper Resistant Devices" Cambridge University, Cambridge, England. Apr. 1997.
Milor et al., "Logic Product Speed Evaluation and Forecasting During the early phases of Process Technology Development Using Ring Oscillator Data," 2nd International Work Statistical Metrology, 1997 pp. 20-23.
Ross Anderson et al. "Tamper Resistance—a Cautionary Note". Cambridge University, Cambridge, England Nov. 1996.
Tuyis et al., "Information—Theoretic Security Analysis of Physical Uncloneable Functions," Proceedings ISIT 2004 (Chicago), p. 141.
Omura, J.K., Novel Applications of Crytogrtaphy in Digital Communications, IEEE Comm. Mag., May 1990, pp. 21-29.
Srinivas Devadas et al., "Synthesis of Robust Delay-Fault Testable Circuits Practice" Massachusetts Institute of Technology, Cambridge, MA Mar. 1992.
Srinivas Devadas et al., "Synthesis of Robust Delay-Fault Testable Circuits. Theory" Massachusetts Institute of Technology, Cambridge, MA Jan. 1992.
Sean W Smith et al. "Building a High-Performance, Programmable Secure Coprocessor". IBM T.J. Watson Research Center, Yorktown Heights, NY. Oct. 16, 1998.
Duane S. Boning et al., "Models of Process Variations in Device and Interconnect," Massachusetts Institute of Technology, Cambridge, MA Aug. 23, 1999.
Ravikanth, Pappu Srinivasa "Physical One-Way Functions". Massachusetts Institute of Technology, Cambridge, MA. Mar. 2001.
Blaise Gassend et al., "Silicon Physical Unknown Functions and Secure Smartcards," Massachusetts Institute of Technology, Cambridge, MA May 13, 2002.
Blaise Gassend et al. "Controlled Physical Unknown Functions: Applications to Secure Smartcards and Certified Execution," Massachusetts Institue of Technology, Cambridge, Jun. 10, 2002.
Blaise Gassend et al., "Silicon Physical Random Functions", MIT , Proceedings of the Computer and Communication Security Conference, Nov. 2002, Memo 456.
Blaise Gassend, "Physical Random Functions," Massachusetts Institute of Technology, Cambridge, MA Feb. 2003.
Gassend, B.L.P., Physical Random Functions, Thesis at the Massachusetts Institute of Technology, pp. 1-89 (Feb. 1, 2003) XP002316843.
Daihyun Lim, "Extrating Secret Keys from Integrated Circuits" Massachusetts Institute of Technology, Cambridge, MA, May 2004.
Lee et al., "A Technique to Build a Secret Key in Intergrated Circuits for Identification and Authentication Applications," Massachusetts Institute of Technology (CSAIL) Jun. 2004.
Xilinx (Ralf Krueger) "Using High Security Features in Virtex-II Series FPGAs" www.xilinx.com; [printed Jul. 8, 2004].
Ranasinghe et al., "Secutiry and Provacy Solutions for Low-Cost RFID Systems," (2004).
Tuyls, Pim and Lejla Batina, "RFID-Tags for Anti-Counterfeiting," Topics in Cryptography, vol. 3860/2006, No. LNCS3860, (Feb. 13, 2005) XP002532233.
Tuyls et al., "Security Analysis of Physical Uncloneale Functions," Proc. 9th Conf. on Financial Cryptography and Data Security , Mar. 2000, LNCS 3570, pp. 141-155.
G. Edward Suh, et al., "Design and Implementation of the AEGIS Single-Chip Secure Processor Using Physical Random Functions," In the proceedings of the 32nd International Symposium on Computer Architecture, Madison, Wisconsin, Architecture, Jun. 2005, (Memo-483).
Skoric et al , "Robust Key Extraction from Physical Uncloneable Functions," Proc Applied Crytopgraphy and Network Security 2005, LNCS 3531, pp. 407-422.
Ulrich Ruhrmair "SIMPL Systems: On a Public Key Variant of Physical Unclonable Functions" Cryptology ePrint Archive, Report 2009/255.

* cited by examiner

INDEX-BASED CODING WITH A PSEUDO-RANDOM SOURCE

CROSS-REFERENCE

This application claims the benefit of U.S. Provisional Applications No. 61/231,424, filed Aug. 5, 2009, and No. 61/295,374, filed Jan. 15, 2010, which are incorporated herein by reference.

BACKGROUND

This invention relates to coding of information using a pseudo-random source.

A pseudo-random source (PRS) of values can be used, for example, for applications in which the pseudo-random value can be regenerated, but the value cannot be predicted, or such prediction would be very difficult or time consuming. In some examples, the pseudo-random value depends on an input value, often referred to as a "challenge" value. In some examples, the pseudo-random values comprise bits that are generated by circuitry that implements a function depend on device-specific characteristics, for example, based on device-to-device fabrication variation among a set of devices that are fabricated in a common manner, for example, according to the same semiconductor masks and fabrication conditions. Some examples of such functions have been referred to as Physical Unclonable Functions (PUFs). Device-specific quantities can be generated in ways that depend on device-specific characteristics, for example, based on device-to-device fabrication variation among a set of devices that are fabricated in a common manner, for example, according to the same semiconductor masks and fabrication conditions. Examples of the device-specific characteristics include time-delay along electrical signal paths, and voltage thresholds of active semiconductor devices. In a number of previous approaches, the device specific quantities are binary, for example, based on a comparison of pairs of underlying device-specific characteristics. For example, US Pat. Pub. 2003/0204743A1, titled "Authentication of Integrated Circuits," describes an approach in which a device-specific bit is generated according to the relative delay along two delay paths. As another example, US Pat. Pub. 2007/0250938A1, titled "Signal Generator Based Device Security," describes an approach in oscillation frequencies are compared to determine device-specific bits.

In some techniques, regeneratable pseudo-random bits are used to encode a hidden value so that the encoding (e.g., exclusive OR of pseudo-random bits and hidden value) can be disclosed without directly disclosing the hidden value, and so that the device can use the encoding and re-generated pseudo-random bits to re-generate the hidden value. In some examples, error correction techniques are used to account for differences between the initially generated pseudo-random bits and the re-regenerated pseudo-random bits. For instance, an error correction syndrome may be calculated for the pseudo-random bits, and stored, along with an XOR mask. A degree to which information about the hidden value is "leaked" through knowledge of the error correction syndrome and XOR mask can depend on the statistical characteristics of the pseudo-random values, for instance according to bias characteristics of the pseudo-random values.

SUMMARY

In one aspect, in general, an approach uses a series of pseudo-random quantities to encode a hidden value or set of values. In some examples, the pseudo-random quantities each represent a degree of comparison of devices-specific characteristics. In some examples, the pseudo-random quantities are derived from biometric information of organic (e.g., human) or inorganic sources (e.g., manufacturing variations of surfaces). The hidden value is encoded using indexes into the series of pseudo-random quantities, for example, based on numerically ordering the series of quantities. In some examples, a possibly noisy version of the pseudo-random quantities is re-generated and used to re-generate (decode) the hidden value. In some examples, this decoding of the hidden value does not require additional error correction mechanisms.

In another aspect, in general, an encoding of first data is accepted as data representing a set of one or more indices formed based on a first series of quantities. The first series of quantities is based on a pseudo-random source and the data representing the indices is insufficient to reproduce the first data. A second series of quantities based on the pseudo-random source is generated. The set of one or more indices identifies quantities in the second series. The set of one or more indices and the second series of quantities are combined to reproduce first data.

Aspects may include one or more of the following features.

The first data include multiple elements, and reproducing each element of the first data includes combining a subset of the indices and a subset of the second series of quantities based on the pseudo-random source to reproduce the element. In some examples, the subsets of quantities used to reproduce different of the elements are disjoint subsets.

In another aspect, in general, a decoder includes an input for receiving an encoding of first data as data representing a set of one or more indices. The decoder also includes a pseudo-random source for generating a series of quantities. A combination module in the decoder is used to combine the set of one or more indices and the series of quantities to reproduce first data.

Aspects may include one or more of the following features.

The encoding of the first data includes error correction data, and the decoder further includes an error corrector for application to the encoding prior to processing by the combination module.

In another aspect, in general, a method includes generating a first series of quantities based on a pseudo-random source, each quantity being represented as a multiple bit representation. First data is accepted for encoding, and the first data is encoded as a first set of one or more indices into the series of generated values according to a mapping function from the generated values to functions of index positions in the series.

Aspects may include one or more of the following features.

The mapping function depends on a numerical ordering of the quantities in the first series.

The method further includes generating a second series of quantities based on the pseudo-random source, the quantities in the first series corresponding to the quantities in the second series. The first set of one or more indices and the second series of quantities are combined to reproduce the first data.

Generating the first series of quantities includes generating said quantities according to a challenge value, and where generating the second series of quantities includes generating said quantities according to the challenge value.

The pseudo-random source depends on device-specific characteristics that vary among like devices formed according to a common design.

The pseudo-random source depends on biometric characteristics and/or on characteristics of an organic or an inorganic source.

The pseudo-random source may include multiple separate sources. For instance, one separate source may depend on device specific characteristics while another separate source may depend on biometric characteristics.

Each of the series of quantities represents a degree of comparison of device-specific values.

Each quantity includes a polarity and a magnitude of the comparison.

Aspect can include one or more of the following advantages.

The encoding scheme provides low information leakage by taking advantage of pseudo-random sequence randomness, taking advantage of both the polarity and confidence information in each output value, and/or by introducing non-linear mapping between the data bits to be encoded and the index-based outputs.

When the output of the PRS is viewed as a series of soft bits, the index-based encoding effectively forms a soft-decision encoder. The soft-decision encoder (an encoder that takes as input "soft" bits) is made possible by using index-based encoding, and brings about advantages that are evident in the description contained in this document.

Even if either the pseudo-random sequence or data source (consisting of polarity information), or both, are biased, this information is not directly leaked via the index-based outputs.

One approach to computing an error correction syndrome is by exclusive OR of PRS bits with parity from an encoder (herein referred to as conventional syndrome generation method). To the extent that PRS (PUF) exhibits bias, for example, product of PRS bias and parity bias is leaked into syndrome, which is public information. As an example, if a particular PRS has a bias of 0.125 towards 0 (i.e., around ⅝ of the bits are 0), if n-k parity also as 0.125 bias towards 0, product (syndrome) has 0.03125 bias towards 0. Using index based syndrome, even if both the PRS output and parity is biased, or very heavily biased, product of bias is not leaked out through the syndrome. Decoupling the security of the syndrome from bias characteristics of PUF output (not possible with conventional syndrome generation method) allows, for example, for more modular design techniques.

In a degenerate case where the PRS outputs one bit values, index-based encoding still achieves the desired effect, by randomly selecting the address (index) of a bit in the pseudo-random bit sequence that matches, and writing out the index. If none of the bits match, a random mismatching bit is selected. If bit exact reproduction is desired, further error correction techniques can be applied.

Using NIST's statistical test for randomness, index based syndrome values have been tested to be random using representative test sequences as input. In some examples, correlation tests shows similar results in that 95% of correlation value are within 2 standard error of ideal unbiased correlation value, and the few outliers do not stray much further than 2 standard errors from ideal. Index-based encoding can be a form of "soft-decision" encoding that takes advantage of multi-bit valued PRS output to, among other effects, decorrelate syndrome from parity or PUF bias.

The use of index-based outputs as a means of error correction reduces the complexity of encoding and/or decoding as compared to conventions error correction approaches.

In some use cases, the combination provides a degree of error correction that is not practical using conventional error correction alone. Coding gain can be achieved using index-based encoding allowing the combined decoder to error correct in conditions with higher noisy densities, thus allowing ECC decoder to operate on smaller block sizes, thus reducing ECC complexity.

In some examples, the coding scheme operates on pseudo-random sources, which are possibly noisy, in a way that is challengable (degenerate case include challenge being fixed) and has real-valued outputs (polarity and magnitude information; or in some degenerate cases outputs only polarity information). The PRS may include biometric readings, splotch of paint, optical or magnetic readings, piece of paper or fabric, device-specific signatures from an integrated circuit, or a variety of other characteristics that can be modeled as a pseudo-random source, which is possibly noisy. In some examples, the PRS outputs real values in the sense that the output is more than a single hard bit (polarity) (although in degenerate cases the PRS may output only a single bit value and multiple reading are taken to synthesize a "real" value). That is, confidence/magnitude information is present as well. Coding of information can be directly from PRS or a recombined variant, such as in a recombination PUF.

In some examples, the PRS depends of one or more of biometric readings, measurements of physical characteristics such as paint splotch patterns, speckle patterns, optical or magnetic readings, piece of paper or fabric, device-specific signatures from an integrated circuit, each of which can be modeled as a direct, or possibly noisy, observation of a pseudo-random source.

Advantage of index based coding can include the syndrome revealing minimal information about embedded secret. In conventional XOR method, bias PUF may leak information about secret. Specifically, the product of PUF bias and secret bias may be leaked into an error correction syndrome, which reduces brute force effort to guess secret. PUF bias thus leak secret information as first order effect. In at least some examples of the present approach, first order information is not leaked even if PUF or secret or both as biased, when Index Based Coding is used.

Using NIST's statistical test for randomness, index based syndrome values have been tested to be random using representative test sequences as input. In some examples, correlation tests shows similar results in that 95% of correlation value are within 2 standard error of ideal unbiased correlation value, and the few outliers do not stray much further than 2 standard errors from ideal.

A further advantage of one or more embodiments is that there is processing gain associated with well-chosen mapping functions for index based syndrome, which can result in exponential reduction in ECC complexity.

Furthermore, one-to-many mapping of data bits to syndrome is possible, further enhancing security. Further security may also be gained by using iterative chaining techniques.

Other features and advantages of the invention are apparent from the following description, and from the claims.

DESCRIPTION

Figure 1:
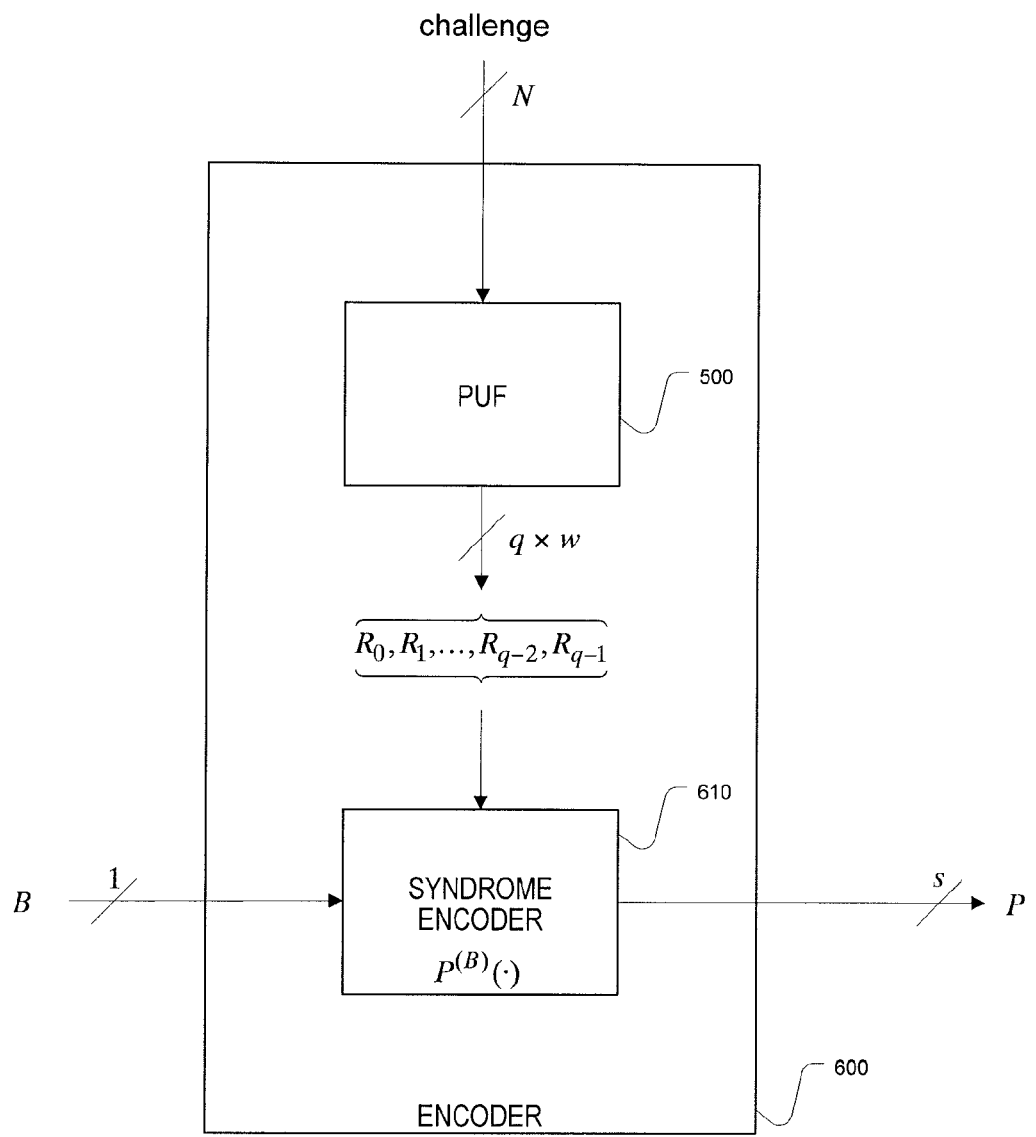
FIG. 1 is a block diagram of an index-based encoder.
Figure 2:
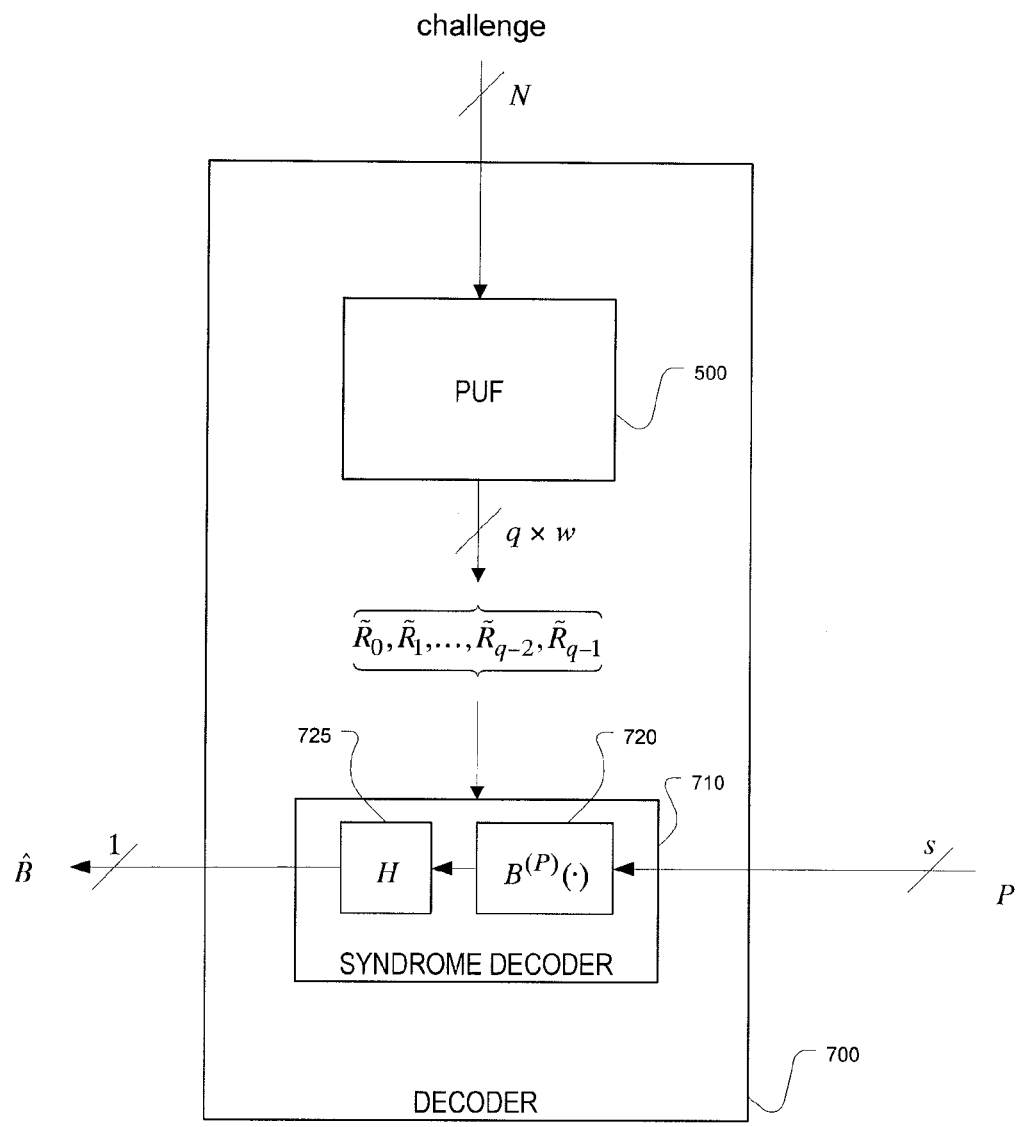
FIG. 2 is a block diagram of an index-based decoder.

Referring to FIG. 1, in an example of use of a pseudo-random source (PRS) to encode a value, an encoder 600 accepts a single bit value, B, and an N-bit challenge, and produces as output P, an s-bit encoding of B. Referring to FIG. 2, a decoder 700 accepts P, and uses the same challenge to produce B̂, which in normal operation is expected to regenerate the original value B. The value B can be from an arbitrary source, for instance, such as a random number generator or partially or entirely derived also from a pseudo random source and/or a challenge value, or a value chosen by a user.

Referring again to FIG. 1, the encoder 600 makes use of a multiple value PUF 500, which operates as a noisy pseudorandom source (PRS). The PUF 500 accepts the challenge value, and produces a series of q values, $\underline{R}=(R_0, \ldots, R_{q-1})$, each represented as a w-bit number, for instance, as a signed two's complement number. In some implementation, the PUF 500 generates the values based on the challenge in a native manner, for instance, with the challenge being using to select the values as measurements of a set of underlying pseudorandom values. In some examples, the values are generated using one or more approaches as described in US Pat. Pub. 2003/0204743A1, titled "Authentication of Integrated Circuits." In some examples, the PUF 500 is implemented using an approach presented in the U.S. Provisional Application No. 61/231,417, titled "RECOMBINATION OF A PSEUDO-RANDOM SOURCE," filed Aug. 5, 2009, which is incorporated herein by reference. In some examples, techniques may be used to generate the pseudo-random values as described in US Pat. Pub. 2003/0204743A1, titled "Authentication of Integrated Circuits," or US Pat. Pub. 2007/0250938A1, titled "Signal Generator Based Device Security," which are incorporated herein by reference. In some examples, each output value contains both polarity information (1 or 0) as well as confidence information (strength or confidence level of 1 or 0). One way to represent a real-valued output is to have each output value in 2s-complement representation. A sign bit (1'-b0) represents a 1-bit PUF output, and a sign bit (1'b1) represents a 0-bit PUF output. The strength (or confidence level) of the 1 or 0 PUF output is represented by the remaining non-most-significant bits. Another representation of real-valued output is to show the PUF output bit in its native form (0 for a PUF output 0, 1 for a PUF output 1), and have a unary number of 1s representing output strength. Examples of PUFs with real-valued outputs include PUFs producing outputs resulting from oscillator comparisons with possibly selectable paths through each oscillator ring. Alternative approaches include synthesizing real-valued outputs from a PUF that outputs single-bit values. An example would be to take multiple readings of single-bit PUF output to obtain confidence information for that output value. The use of the syndrome encoded with a real-valued PUF allows the encoder to minimize information leak while increasing coding gain.

The encoder 600 includes a "syndrome" encoder 610, which applies one of a family of functions $P^{(B)}(\bullet)$, which is indexed by the value B being encoded, to the sequence of values $\underline{R}=(R_0, \ldots, R_{q-1})$. That is, for a one-bit input (i.e., 0 or 1), there are two functions, $P^{(0)}(\bullet)$ and $P^{(1)}(\bullet)$. Each function takes as input the sequence of pseudo-random values, $\underline{R}=(R_0, \ldots, R_{q-1})$ and provides an s-bit index as an output, for instance where $q \leq 2^s$ such that s is sufficiently large to uniquely specify an index in the range 0 to q−1. Note that the s-bit index can be represented using a variety of encoding approaches, for example, as an explicit s-bit number, of as an alternate representation that can be translated into an index, including direct addressing, indirect addressing, relative addressing, encoding of differential distance, etc.

Note that in other embodiments, more generally, the input B can take on one of more than two values, for example, one of eight values. In such a case, one of eight functions $P^{(B)}(\bullet)$, indexed by B, are used using the sequence as input.

One example of an index based encoding function with a binary input is based on the indices of the extreme values in the sequence:

$$P^{(B)}(R_0, \ldots, R_{q-1}) = \begin{cases} \mathrm{argmin}_i R_i & \text{if } B=0 \\ \mathrm{argmax}_i R_i & \text{if } B=1 \end{cases}$$

Referring to FIG. 2, in decoding, the decoder re-generates the device-specific values as $\tilde{R}=(\tilde{R}_0, \ldots, \tilde{R}_{q-1})$. It should be noted that the values are not exactly equal, but it is expected that the values are at least approximately numerically equal, $\tilde{R}_i \approx R_i$. Because the values are approximately equal, the ordering by value is approximately the same, but not necessarily identical, as used in the encoder.

The decoder 700 includes a syndrome decoder 710, which accepts the index value P, and outputs an estimate $\hat{B}$, which in normal operation is expect to re-generate the original value B. In some examples, this re-generation is done by first generating applying a regeneration function $B^{(P)}(\bullet)$ to the sequence of values, $\underline{\tilde{R}}=(\tilde{R}_0, \ldots, \tilde{R}_{q-1})$, to produce a "soft" reconstruction of the value B, followed by a hard decision $H(\bullet)$, which outputs the one-bit re-generation of B.

One example of the regeneration function $B^{(P)}(\bullet)$, which is compatible with the maximum and minimum encoding function shown above in the case that the values $R_i$ are distributed about zero is:

$$B^{(P)}(\tilde{R}_0, \ldots, \tilde{R}_{q-1}) = \tilde{R}_P$$

and $$H(\tilde{R}_P) = \begin{cases} 0 & \text{if } \tilde{R}_P < 0 \\ 1 & \text{if } \tilde{R}_P \geq 0. \end{cases}$$

Note that these encoding and decoding functions can be understood to be compatible based on the observation that in encoding, the device-specific value that is maximum is the most positive, and therefore, the re-generation of that value is expected to remain at least positive, even if it is not the maximum of the regenerated sequence. Similarly, the minimum value in encoding is expected to be remain negative when it is regenerated.

Note that these encoding, decoding, and hard decision functions are only one example. Other examples may not correspond to the maximum and minimum values in the sequence in encoding. For example, the encoding functions could correspond to the index of the second largest versus the second smallest value, or index of the median versus the value most different than the median. Also, in some embodiments, each data bit may be encoded with a tuple of multiple indices, or groups of bits may each be encoded with a tuple of indices. An example of encoding using a pair (i.e., two-tuple), the output may comprise the pair of indices representing the two values that are most arithmetically different versus the pair of indices of values that are closest to equal. As introduced above, in some examples B can take on more than two values (i.e., represented using multiple bits), and in such examples, a multibit value can be represented by a set of multiple indices.

In some examples, the decoding function is $$B^{(P)}(\tilde{R}_0, \ldots, \tilde{R}_{q-1}) = Pr(B=1 | P, \tilde{R}_0, \ldots, \tilde{R}_{q-1})$$

based on a probabilistic model of the encoding process, thereby generating a "soft bit" re-regeneration of the original data. In another example, soft bits can be generated by extracting polarity and magnitude of $\tilde{R}_p$.

Figure 3:
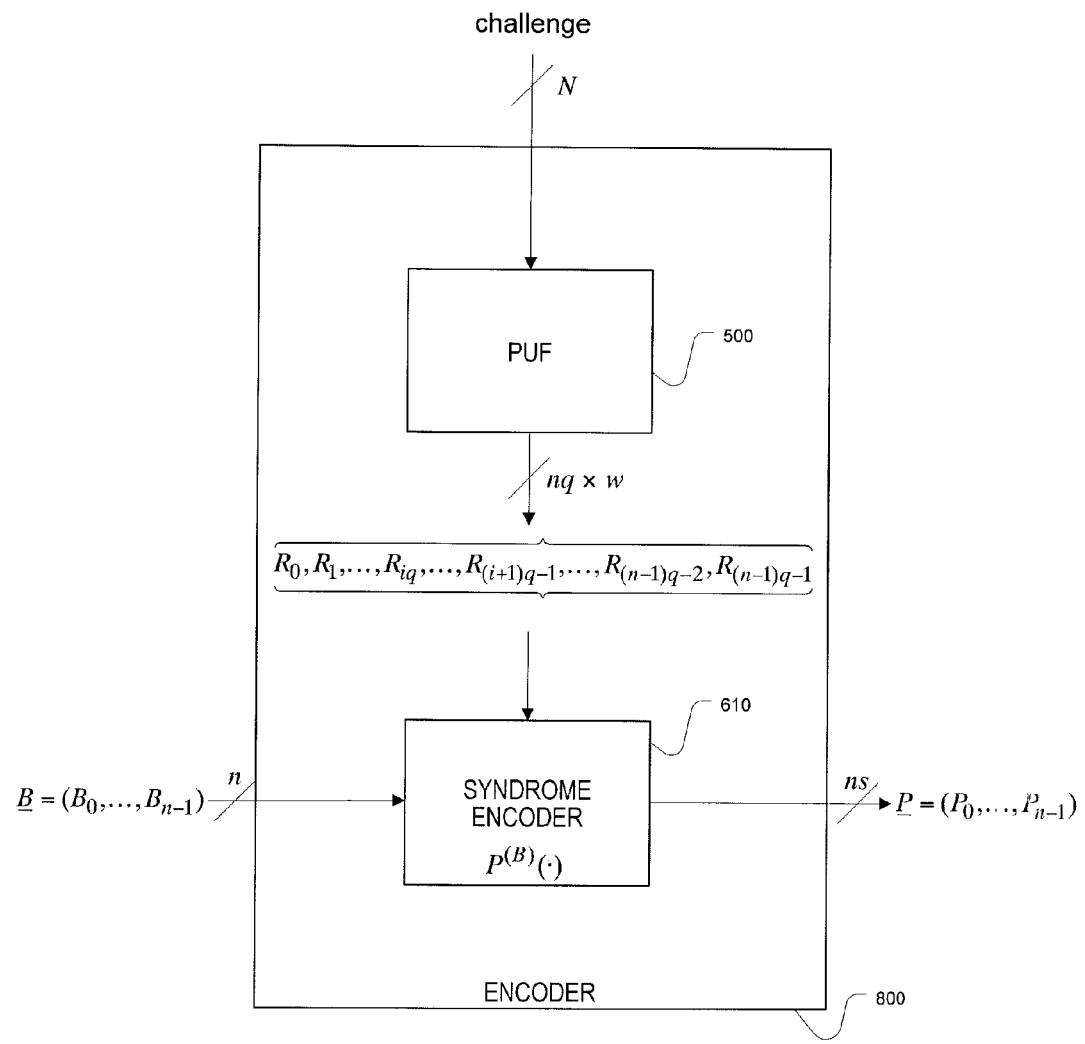
FIG. 3 is a block diagram of an index-based encoder for multiple data bits.

Referring to FIG. 3, the approach shown above in FIGS. 1 and 2 can be extended for an encoder 800 that is used to encode a set or sequence of bits $\underline{B}=(B_0, \ldots, B_{n-1})$. The multiple value PUF 500 is used to generate a sequence of nq values, $(R_0, \ldots, R_{(n-1)q-1})$, such that $B_i$ is encoded using the subset of values $(R_{iq}, R_{iq+1}, \ldots, R_{(i+1)q-1})$ to produce an index value, $P_i$, yielding the overall encoder output, $\underline{P}=(P_0, \ldots, P_{n-1})$. In decoding, each bit can be decoded independently (or alternatively jointly) to yield $\underline{\hat{B}}=(\hat{B}_0, \ldots, \hat{B}_{n-1})$. Note that in some embodiments, rather than n disjoint subsets of q values, completely or partially overlapping subsets of values can be used. In some examples, pairs or more generally blocks of input bits are encoded together, for instance, using overlapping subsets of values, with each block being encoded with a new set of values.

As discussed above, the encoding of a single bit value using an s-bit index introduces a degree of error resilience. In some examples in which multiple data bits are to be encoded, further redundancy, and with it further error resilience, is introduced into the n-bit bit sequence $\underline{B}$, for example, by using fewer than n information bearing bits with the remaining bits providing redundancy. For example, k information bearing bits are augmented with n-k redundancy bits using conventions Error Correction Code (ECC) techniques. The approach illustrated in FIG. 3 is then applied to encode the full sequence of n bits, $\underline{B}$. Decoding using the approach described above yields an n-bit result, $\underline{\hat{B}}$. This result is then error corrected based on the redundancy information to yield an n-bit error corrected result, $\underline{\hat{\hat{B}}}$, from which the k information bearing bits are recovered. In a different example, only n-k redundancy bits are encoded into indices P, and the remaining k bits are regenerated from a PRS. In such a case B is not just any random bit value but a value sourced from PRS.

Also as introduced above, in some implementations of decoding "soft bits" are recovered, such that for a sequence of n encoded bits, as sequence of n soft bits, $\underline{\tilde{B}}=(\tilde{B}_0, \ldots, \tilde{B}_{n-1})$ are first recovered, and then a soft error correction approach is applied to the entire sequence of soft bits yield the reconstructed error corrected values $\underline{\hat{B}}=(\hat{B}_0, \ldots, \hat{B}_{n-1})$.

In another approach, the encoding approach shown in FIG. 3 for a sequence of bits $\underline{B}=(B_0, \ldots, B_{n-1})$ is applied by using the same input, B, but repeating the process m times to yield a sequence of indexes, $\underline{P}=(P_0, \ldots, P_{m-1})$, such that $P_i$ depends on r device specific values $R_{ir}, \ldots, R_{(i+1)r-1}$, from an entire sequence generated by the multiple value PRS, $(R_0, \ldots, R_{mr-1})$. In decoding, in one approach, the decoder first determines m estimates, $\underline{\hat{B}}=(\hat{B}_0, \ldots, \hat{B}_{m-1})$, from which, for example, by voting, it then yields the overall estimate $\hat{\hat{B}}=\text{vote}(\hat{B}_0, \ldots, \hat{B}_{m-1})$. In another approach, the decoder first generates m soft bits, $\underline{\tilde{B}}=(\tilde{B}_0, \ldots, \tilde{B}_{n-1})$, from which the recovered data bit is estimated.

Another approach combines a number of techniques described above:

Encoder:
a. Accept k information bearing bits $\underline{B}=(B_0, \ldots, B_{k-1})$
b. Form n bits incorporated error correction information $\underline{B}=(B_0, \ldots, B_{n-1})$
c. Accept a challenge, and generate nmr device specific values $R_0, \ldots, R_{nmr}$
d. For each bit $B_i$, for $j=0, \ldots, m-1$, encode $B_i$ using $(R_{imr+jr}, \ldots, R_{imr+(j+1)r-1})$ to produce index $P_{i,j}$ Decoder:
a. Accept the set of indices $P_{i,j}$
b. For each index, decode a soft bit $\tilde{B}_{i,j}$ from $(\tilde{R}_{imr+jr}, \ldots, \tilde{R}_{imr+(j+1)r-1})$
c. Combine the sets of m soft bits to generate corresponding soft bits $\tilde{B}$
d. Apply a soft error decoder to reconstruct the k information bearing bits $\underline{\hat{B}}=(\hat{B}_0, \ldots, \hat{B}_{k-1})$ Other embodiments do not necessarily use an input challenge. For example, the device-specific values can be based only of device characteristics, or can be based on a fixed challenge that in integrated into the device.

As introduced above, a variety of pseudo-random sources, which permit noisy regeneration, can be used with the index-based coding and decoding. Examples include biometric readings (e.g., iris scans, fingerprints, etc.), or from human generated passwords. In some examples, the pseudo-random source that is used is generated from a combination of sources, for example, based in part on "uncloneable" characteristics of a device (e.g., a silicon PUF) and biometric readings.

The values being encoded and later regenerated (e.g., the values B above), can be used for a variety of authentication and/or cryptographic functions, including key generation.

In some examples, a device may implement an index-based encoder or an index-based decoder, but not necessarily both. For instance, the device may include the PRS, and provide the outputs of the PRS to an enrollment function, which is not necessarily hosted in the device. Later the device, using the same PRS can regenerate a value encoded in the enrollment function.

In some examples, the encoding function is based on a model of the PUF rather than physical application of the particular challenge to the PUF. For instance, in an enrollment phase, parameters of a physical instance of a PUF are extracted, for example, based on a set of measurements of outputs based on a limited set of challenge inputs. These parameters are known to the encoding system, which uses those parameters to predict the sequence of outputs $\underline{R}=(R_0, \ldots, R_{q-1})$ that will be generated by the device at decoding time with a particular challenge. This sequence is used to determined the index output to encode the hidden value B. At decoding time, one approach is to regenerate the sequence of values as $\underline{\tilde{R}}=(\tilde{R}_0, \ldots, \tilde{R}_{q-1})$ from which the estimate of the hidden value is determined. Note however that it may not be necessary for the PUF to actually generate the multibit values $\underline{\tilde{R}}=(\tilde{R}_0, \ldots, \tilde{R}_{q-1})$. For example, using a reconstruction function $$H(\tilde{R}_P) = \begin{cases} 0 & \text{if } \tilde{R}_P < 0 \\ 1 & \text{if } \tilde{R}_P \geq 0 \end{cases}$$

does not require a multibit output. In this example, it is suitable for the PUF to output the sign as a one-bit output, even though the encoding was based on a simulation of the full multibit output.

In some examples, the values $R_i$ are not necessarily represented in digital form. For instance, they may be accepted as analog signals and either converted to a digital form for determining the index outputs, or processed directly in their analog form (e.g., in an analog signal processing circuit).

Implementations of approaches described above may use software, hardware, or a combination of software and hardware. Software may include instructions stored on a machinereadable medium, for causing a general or special-purpose processor to implement steps of the approaches. The hardware may include special-purpose hardware (e.g., application specific integrated circuits) and/or programmable gate arrays.

In some examples, the PUF and syndrome encoder and/or decoder are implemented in a device, such as an RFID or a secure processor. The decoded data may be used as or used to form a cryptographic key or for other cryptographic or security (e.g., authentication) functions. In some examples, the syndrome encoder is implemented in a different device than the pseudo-random source.

It is to be understood that the foregoing description is intended to illustrate and not to limit the scope of the invention, which is defined by the scope of the appended claims. Other embodiments are within the scope of the following claims.

What is claimed is:

1. A method comprising:
  accepting an encoding of first data as data representing a series of one or more indices formed based on a first series of quantities generated by a first pseudo-random source, the data representing the indices being insufficient to reproduce the first data;
  using circuitry implementing a second pseudo-random source, generating a second series of quantities with the second pseudo-random source, the second series of quantities differing from the first series of quantities, the series of one or more indices identifying quantities in the second series; and
  combining the series of one or more indices and the second series of quantities to reproduce the first data.

2. The method of claim 1 wherein generating the second series of quantities includes accepting a challenge value and generating said quantities according to the accepted value, wherein the series of one or more indices were formed according to said challenge value.

3. The method of claim 1 wherein the first data include a plurality of elements, wherein reproducing each element of the first data includes combining a subset of the indices and a subset of the second series of quantities based on the pseudo-random source to reproduce the element.

4. The method of claim 3 wherein the subset of the indices and the subset of the second series of quantities used to reproduce different of the elements are disjoint subsets.

5. The method of claim 1 wherein one or both of the first pseudo-random source and the second pseudo-random source includes a plurality of separate pseudo-random sources.

6. The method of claim 5 wherein at least one of the separate pseudo-random sources is integrated in a device that performs the combining of the indices and the second series of quantities, and at least another is separate from the device.

7. An apparatus comprising:
  an encoder including:
    circuitry implementing a first pseudo-random source for generating a first series of quantities, each quantity being represented as a multiple bit representation,
    an input circuit for receiving first data for encoding;
    circuitry implementing an encoding module for determining a first series of indices into the generated first series of quantities according to a mapping function from the generated values to functions of index positions in the series; and
    an output circuit for providing an encoding of the first data comprising the first series of indices;
  a decoder including:
    an input circuit for receiving the encoding of the first data comprising the first series of indices
    circuitry implementing a second pseudo-random source for generating a second series of quantities different from the first series of quantities; and
    circuitry implementing a combination module for combining the first series of indices and the second series of quantities to reproduce the first data wherein the first data include a plurality of elements, and wherein the combination module is configured to reproduce each element of the first data by processing a subset of the second series of quantities corresponding to the element according to a subset of the first series of indices identifying one or more quantities in said subset of the second series of quantities.

8. The apparatus of claim 7 wherein the second pseudo random source is configurable to generate the second series of quantities according to a challenge value.

9. The apparatus of claim 7 wherein the encoding of the first data includes error correction data, and the decoder further includes an error corrector for application to the encoding after processing by the combination module.

10. The apparatus of claim 7 wherein the second pseudo-random source is integrated in a device that implements the combination module.

11. The apparatus of claim 7 wherein the second pseudo-random source comprises a plurality of separate pseudo-random sources, at least one of which is integrated in a device that implements the combination module, and at least one of which that is separate from the device.

12. The apparatus of claim 7 wherein generating the first series of quantities includes accepting a challenge value and generating said quantities according to the accepted value.

13. The apparatus of claim 7 further configured to:
  combine the first set of one or more indices and the second series of quantities to reproduce the first data.

14. The apparatus of claim 13 wherein generating the first series of quantities includes generating said quantities according to a challenge value, and where generating the second series of quantities includes generating said quantities according to the challenge value.

15. The apparatus of claim 7 wherein the first pseudo-random source circuit depends on device-specific characteristics that vary among like devices formed according to a common design.

16. The apparatus of claim 7 wherein each of the series of quantities represents a degree of comparison of device-specific values.

17. The apparatus of claim 16 wherein each quantity includes a polarity and a magnitude of the comparison.

18. The apparatus of claim 7 wherein the first pseudo-random source and the second pseudo-random source are the same pseudo-random source.

19. The apparatus of claim 7 wherein at least one of the first pseudo-random source and the second pseudo-random source is implemented using processor circuitry as a model of the other pseudo-random source.

* * * * *